US012742109B2

(12) United States Patent
Fritz et al.

(10) Patent No.: US 12,742,109 B2
(45) Date of Patent: Sep. 22, 2026

(54) SILOXANE COMPOUND AND FORMULATIONS COMPRISING SAID COMPOUND

(71) Applicant: Evonik Operations GmbH, Essen (DE)

(72) Inventors: Jürgen Gerhard Fritz, Grenzach-Wyhlen (DE); Ingo Kiefer, Schopfheim (DE); Kerstin Weissenbach, Gengenbach (DE); Daniela Huber, Inzlingen (DE); Svenja Morast, Schoenau im Schwarzwald (DE); Lars Matt, Schallbach (DE)

(73) Assignee: Evonik Operations GmbH, Essen (DE)

( * ) Notice: Subject to any disclaimer, the term of this patent is extended or adjusted under 35 U.S.C. 154(b) by 759 days.

(21) Appl. No.: 18/042,764

(22) PCT Filed: Aug. 24, 2021

(86) PCT No.: PCT/EP2021/073314

§ 371 (c)(1),
(2) Date: Feb. 23, 2023

(87) PCT Pub. No.: WO2022/043285

PCT Pub. Date: Mar. 3, 2022

(65) Prior Publication Data

US 2023/0357508 A1 Nov. 9, 2023

(30) Foreign Application Priority Data

Aug. 27, 2020 (EP) .................................... 20193136

(51) Int. Cl.

| | |
|---|---|
| ***C09J 183/08*** | (2006.01) |
| ***C08G 77/26*** | (2006.01) |
| ***C09D 183/08*** | (2006.01) |
| *C08G 77/14* | (2006.01) |
| *C08G 77/28* | (2006.01) |

(52) U.S. Cl.

CPC ............ *C09J 183/08* (2013.01); *C08G 77/26* (2013.01); *C09D 183/08* (2013.01); *C08G 77/14* (2013.01); *C08G 77/28* (2013.01); *C08G 2170/00* (2013.01); *C08G 2190/00* (2013.01)

(58) Field of Classification Search

CPC ..................................................... C08G 77/26

See application file for complete search history.

(56) References Cited

U.S. PATENT DOCUMENTS

| | | | | |
|---|---|---|---|---|
| 12,043,738 | B2 | 7/2024 | Friedel | |
| 2007/0265409 | A1 | 11/2007 | Wakabayashi et al. | |
| 2008/0033062 | A1* | 2/2008 | Herzig | C08G 77/388 516/55 |
| 2009/0247712 | A1 | 10/2009 | Tanaka et al. | |
| 2016/0257819 | A1 | 9/2016 | Pathak et al. | |
| 2019/0153166 | A1 | 5/2019 | Scheim et al. | |

FOREIGN PATENT DOCUMENTS

| | | |
|---|---|---|
| CN | 101787244 A * | 7/2010 |
| CN | 107429114 | 12/2017 |
| CN | 111303828 | 6/2020 |
| EP | 3 660 116 | 6/2020 |
| RU | 2 263 130 | 10/2005 |
| RU | 2004 109 931 | 10/2005 |
| WO | 2004/101652 | 11/2004 |
| WO | 2019/134863 | 7/2019 |

OTHER PUBLICATIONS

"Dye-Molecular-Imprinted Polysiloxanes. II> Preparation, Characterization, and Recognition Behavior" authored by Gong et al. and published in the Journal of Applied Polymer Science (2004) 93, 637-643.*

Machine translation of CN 101787244 (no date).*

International Search Report dated Dec. 9, 2021, in PCT/EP2021/073314, 5 pages.

Written Opinion dated Dec. 9, 2021, in PCT/EP2021/073314, 9 pages.

* cited by examiner

*Primary Examiner* — Marc S Zimmer

(74) *Attorney, Agent, or Firm* — Grüneberg Global IP, PLLC

(57) ABSTRACT

A siloxane compound is useful as a bonding agent in an adhesive formulation or sealant formation. A kit-of-parts can contain the siloxane compound. A corresponding method can be used to synthesize the siloxane agent.

11 Claims, No Drawings

SILOXANE COMPOUND AND FORMULATIONS COMPRISING SAID COMPOUND

CROSS-REFERENCE TO RELATED APPLICATIONS

This application is the National Stage entry under § 371 of International Application No. PCT/EP2021/073314, filed on Aug. 24, 2021, and which claims the benefit of priority to European Application No. 20193136.7, filed on Aug. 27, 2020. The content of each of these applications is hereby incorporated by reference in its entirety.

BACKGROUND OF THE INVENTION

Field of the Invention

The present invention relates to a siloxane compound, a method for its synthesis, an adhesive or sealant formulation comprising said siloxane compound, a respective kit-of-parts for formulating the adhesive or sealant formulation and a method for applying said adhesive or sealant formulation.

Description of Related Art

Organofunctional silanes have been used for many years to formulate adhesives and sealants. Especially amino-functional alkoxysilanes, for example aminopropyltrialkoxysilanes such as aminopropyltrimethoxysilane, have been found to be moderately efficient bonding agents in both unreactive and reactive adhesives and sealants, e.g. for forming bonds between substrates otherwise difficult to join such as plastics.

Especially in moisture-crosslinking adhesives and sealants, for example in alkoxysilane-terminated polymers such as polyurethanes or polyethers, or in silicones, amino-functional alkoxysilanes are commonly used as bonding agent. Bonding agents in adhesives and sealants are typically adhesion promotors and as such improve the adhesion to the different surfaces treated with the adhesives and sealants. Additionally, the amino-functional alkoxysilanes act as co-catalyst due to the alkaline property of the amino-functionality. They further act as co-crosslinker having two reactive sites allowing them to react with reactive groups of substrates such as polymers whereby they become part of the final cured matrix. Thereby, the mechanical properties of adhesives and sealants can be adjusted.

When amino-functional alkoxysilanes are used as bonding agent, it is possible to improve the adhesion to the substrate to be bonded/sealed compared to systems without such silane. At the same time, the reactivity (i.e. the curing speed) of the formulation and the mechanical properties, the cohesion and elasticity of the cured adhesive and sealant can be positively influenced. For the sealing/bonding of substrates that are generally difficult to seal or difficult to bond, for example aluminum and various plastics like polymethylmethacrylate (PMMA) and polycarbonate (PC), amino-functional alkoxysilanes are used as standard although they usually give only mediocre adhesion.

Therefore, it is necessary in various applications to work (in a preparatory step) with primers. This additional step is undesired as it increases the complexity of the process and lengthens the time required to produce a sealing/bond.

Even though there are various attempts described in the prior art to replace the commonly employed aminopropyltrialkoxysilane as bonding agents in adhesives and sealants, none of them proved yet successful in meeting all requirements stipulated by the industry.

This remains even more striking as aminopropyltrialkoxysilanes as bonding agents in the cited formulations suffer from numerous drawbacks. For example, the skin formation time of such formulations is often too slow or high catalyst amounts are required to achieve a sufficiently high reactivity. This is highly undesired as subsequent work steps have to be postponed until a sufficiently hard surface is formed on the adhesive or sealant. Further, the mechanical properties of the sealing/bond formed by the sealant/adhesive are not always sufficient.

As an alternative to aminopropyltrialkoxysilanes, U.S. Pat. No. 6,395,858 B1 discloses the use of siloxane oligomers based on aminopropyl- and alkyl-silanes in adhesives and sealants. These oligomers show improved adhesion performance (compared to amino-functional alkoxysilanes), but they lack the required reactivity.

Another attempt to replace said silanes is described in WO 2004/101652 A1. The authors propose the use of siloxane oligomers based on α-silanes in adhesive and sealants. Despite of fast skin formation times of the proposed adhesives and sealants comprising these oligomers, said formulations give inferior adhesion properties compared to amino-functional alkoxysilane-based formulations.

Another suggestion has been published in US 2015/0284609 A1 using a silane-grafted polymer and an aminosiloxane. Disadvantageously, this solution requires the use of two components resulting in a more complex formulation of the adhesive/sealant. The proportions of both components need to be adjusted carefully which is a severe drawback of this approach.

None of the solutions proposed by the prior art allows for a sufficiently fast skin formation time while allowing for sufficient mechanical properties and adhesion properties to be obtained.

SUMMARY OF THE INVENTION

Objective of the Invention

It is therefore the objective of the present invention to overcome the shortcomings of the prior art.

Thus, it is an objective of the present invention to provide a compound for use as bonding agent in an adhesive formulation or a sealant formulation that achieves stronger bonds compared to the commonly employed bonding agents such as aminopropyltrialkoxysilane.

It is a further objective of the present invention to provide an adhesive formulation or sealant formulation allowing for good mechanical properties of the bonds formed therewith. Such desirable mechanical properties include foremost the flexibility of the bonds.

It is still a further objective of the present invention to provide a method for applying an adhesive formulation or a sealant formulation having excellent adhesion performance. Preferably, the adhesion performance can be obtained without the use of a primer.

These objectives are solved by the siloxane compound for use as bonding agent in an adhesive formulation or a sealant formulation comprising at least one building block according to formula (A)

(A)

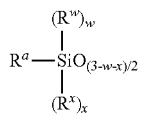

wherein $R^a$ is selected from the group consisting of

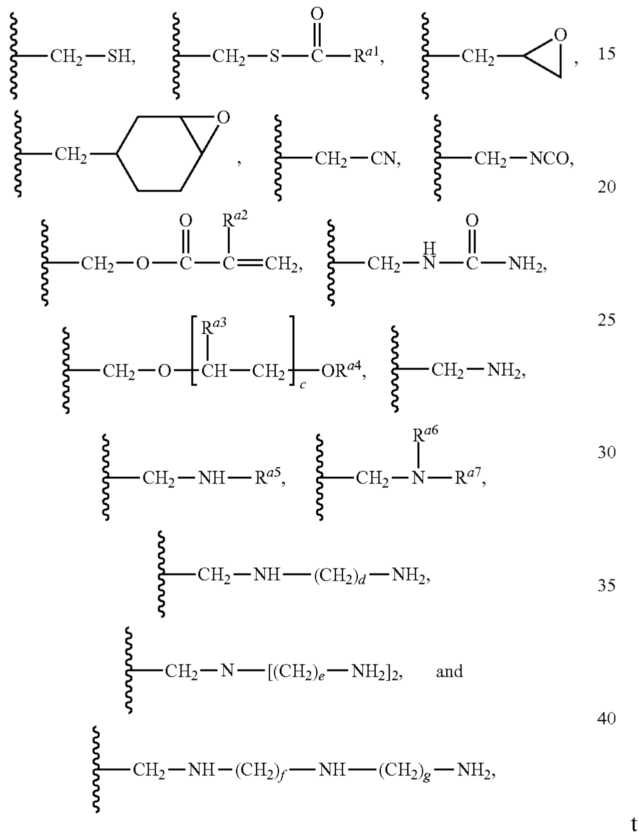

in which $R^{a1}$, $R^{a4}$, $R^{a5}$, $R^{a6}$ and $R^{a7}$ are independently selected from the group consisting of alkyl group and aryl group, $R^{a2}$ is selected from hydrogen and methyl group, each $R^{a3}$ is independently selected from hydrogen and methyl group, c is an integer ranging from 1 to 40, d, e, f and g are integers independently ranging from 2 to 6, $R^w$ is an alkyl group, each $R^x$ is independently selected from the group consisting of hydroxy group, oxyalkyl group, oxyalkanediyloxyalkyl group, oxyaryl group and oxyacyl group, w is selected from 0 and 1, and x is selected from 0, 1 and 2, with the proviso that the sum of w and x ranges from 0 to 2, and at least one building block according to formula (B)

(B)

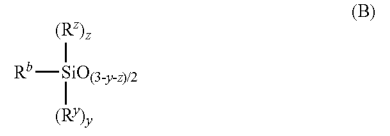

wherein $R^b$ is selected from the group consisting of

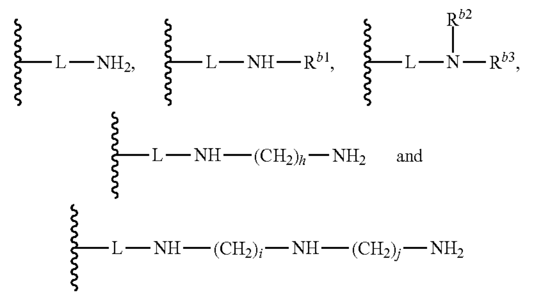

in which

L is a C3-C8-alkanediyl group, $R^{b1}$, $R^{b2}$ and $R^{b3}$ are selected from the group consisting of alkyl group and aryl group, h, i and j are integers independently ranging from 2 to 6, each $R^y$ is independently selected from the group consisting of hydroxy group, oxyalkyl group, oxyalkanediyloxyalkyl group, oxyaryl group and oxyacyl group, $R^z$ is an alkyl group, y is selected from 0, 1 and 2, z is selected from 0 and 1 with the proviso that the sum of y and z ranges from 0 to 2, or a salt of the siloxane compound.

Preferred embodiments solving above described objections particularly well are described in the following description. Advantageously, the present invention allows to prepare adhesive formulations and sealant formulations with excellent overall properties. They can even be easily tailored to meet special market requirements.

Advantageously, the siloxane compound according to the invention used in an adhesive or sealant formulation allows for a reduction of the necessary catalyst amount or the catalyst may become completely redundant.

Surprisingly, the siloxane compound according to the invention greatly shortens the skin formation time of an adhesive formulation or a sealant formulation, e.g. when compared to a commonly used adhesive or sealant, such as one comprising aminopropyltrialkoxysilane as bonding agent (see examples).

It was further entirely unexpected that the mechanical properties of an adhesive formulation or a sealant formulation after crosslinking (e.g. after drying) were superior compared to those obtained from standard adhesives known from the state of the art. Particularly, a high tensile strength and a high elongation at break and a low 100% modulus (tensile stress at 100% elongation) are obtainable when using the adhesive formulation or the sealant formulation according to the invention.

In summary, it is very much surprising that the siloxane compound according to the invention allows for above-described advantages to be obtained. A very balanced set of results can be achieved when using the siloxane compound according to the invention in an adhesive formulation or a sealant formulation (notably a relatively short skin formation time combined with excellent adhesion performance and good mechanical properties of the cured formulation).

DETAILED DESCRIPTION OF THE INVENTION

Percentages throughout this specification are weight-percentages (wt.-%) unless stated otherwise. Yields are given as percentage of the theoretical yield. Concentrations given in this specification refer to the volume or mass of the entire solutions or dispersions unless stated otherwise.

The term "alkyl" according to the present invention comprises branched or unbranched alkyl groups comprising cyclic and/or non-cyclic structural elements, wherein cyclic structural elements of the alkyl groups naturally require at least three carbon atoms. C1-CX-alkyl in this specification refers to alkyl groups having 1 to X carbon atoms (X being an integer). C1-C8-alkyl for example includes, among others, methyl, ethyl, n-propyl, iso-propyl, n-butyl, isobutyl, sec-butyl, tert-butyl, n-pentyl, iso-pentyl, sec-pentyl, tert-pentyl, neo-pentyl, hexyl, beptyl and octyl. Substituted alkyl groups may theoretically be obtained by replacing at least one hydrogen by a functional group. Unless stated otherwise, alkyl groups are preferably selected from substituted or unsubstituted C1-C8-alkyl, more preferably from substituted or unsubstituted C1-C4-alkyl because of their improved compatibility with the other components in adhesive and sealant formulations.

The term "alkanediyl" is the corresponding group having two free valences (bonding sites). Sometimes, it is referred to as "alkylene" in the art. Said residues according to the present invention comprise cyclic and/or non-cyclic structural elements and can be linear and/or branched. C1-C4-alkanediyl for example includes, among others, methane-1,1-diyl, ethane-1,2-diyl, ethane-1,1-diyl, propane-1,3-diyl, propane-1,2-diyl, propane-1,1-diyl, butane-1,4-diyl, butane-1,3-diyl, butane-1,2-diyl, butane-1,1-diyl, butane-2,3-diyl. Furthermore, individual hydrogen atoms bound to the alkanediyl compound may in each case be substituted by a functional group such as those defined above for the alkyl group. Unless stated otherwise, alkanediyl groups are preferably selected from substituted or unsubstituted C1-C8-alkanediyl, more preferably from substituted or unsubstituted C1-C4-alkanediyl because of their improved compatibility with the other components in adhesive and sealant formulations.

The term "aryl" according to the invention refers to ring-shaped aromatic hydrocarbon residues, for example phenyl or naphtyl where individual ring carbon atoms can be replaced by N, O and/or S, for example benzothiazolyl. Preferably, no carbon atoms are substituted to avoid undesired side-reactions in the preparation of the siloxane compounds. Furthermore, aryl groups are optionally substituted by replacing a hydrogen atom in each case by a functional group. The term C5-CX-aryl refers to aryl groups having 5 to X carbon atoms (optionally replaced by N, O and/or S) in the ring-shaped aromatic group (X naturally being an integer). C5-C6-aryl is preferred unless stated otherwise.

The term "acyl" according to the invention refers to hydrocarbon groups comprising hydrogen or preferably, at least one alkyl group bound to a moiety via a carbonyl group. They are formally derived from carboxylic acids by substituting a hydroxy group by the moiety to which they are bound. Examples of acyl groups include formyl (H—CO—), acetyl ($CH_3$—CO—) and proprionyl ($CH_3$—$CH_2$—CO—). An "oxyalkyl group" is an alkyl group further comprising an oxygen atom. Said oxygen atom is the bonding site of the oxyalkyl group. Examples of oxyalkyl groups include inter alia methoxy (—O—$CH_3$), ethoxy (—O—$CH_2$—$CH_3$) and n-propoxy (—O—$CH_2$—$CH_2$—$CH_3$). Similarly, an "oxyaryl group" is an aryl group further comprising an oxygen atom as its bonding site, e.g. phenoxy (—O—$C_6H_5$).

An "alkanediyloxyalkyl group" according to the present invention comprises an alkyl group and an alkanediyl group linked by an oxygen atom. Examples of alkanediyloxyalkyl groups include methoxymethyl (—$CH_2$—O—$CH_3$), ethoxymethyl (—$CH_2$—$CH_2$—O—$CH_3$), propoxymethyl (—$CH_2$—$CH_2$—$CH_2$—O—$CH_3$) and butoxymethyl (—$CH_2$—$CH_2$—$CH_2$—$CH_2$—O—$CH_3$).

An "oxyalkanediyloxyalkyl group" is an alkanediyloxyalkyl group having a further oxygen atom as its bonding site. An oxyacyl group is basically the acid part of an ester group, examples being formiate (—O—CO—H), acetate (—O—CO—$CH_3$) and proponiate (O—CO—$CH_2$—$CH_3$).

If more than one residue is to be selected from a given group, each of the residues is selected independently from each other unless stated otherwise hereinafter, meaning they can be selected to be the same members or different members of said group. This includes the named building blocks according to formulae (A) and (B). The bonding sites in some chemical formulae herein may be emphasized by a wavy line ("∿∿") as it is customary in the art.

Embodiments described in the following description can be combined without restraints unless specifically excluded or technically impossible. This includes the embodiments described for different aspects of the present invention as long as technically feasible. To avoid unnecessary repetitions, they are not cited again.

The term "at least one" in the specification means "one or more than one", e.g. two or three. The terms "adhesive" and "sealant" are used interchangeably herein.

The Siloxane Compound According to the Invention

The siloxane compound according to the invention comprises at least one building block according to formula (A) and at least one building block according to formula (B).

Depending on various factors such as for example on the pH value of a medium comprising the siloxane compound according to the invention, the siloxane compound is present in the form as defined by above formulae or it is present in the form of a corresponding salt. Such salts are exemplarily acidic salts such as a hydrochloride salt (obtained by treating the siloxane compound with hydrochloric acid) or a hydrosulfate salts (obtained by treating the siloxane compound with sulfuric acid) or basic salts such as a silica salts. In the latter case, hydroxy groups, e.g. those bound by a silicon atom in the siloxane compound are optionally converted into the anionic oxo-groups having a suitable counterion such as a sodium ion or a potassium ion (giving for example —$O^-Na^+$). This can be achieved by treating the siloxane compound with an alkaline medium comprising a base such as sodium hydroxide or potassium hydroxide. It is preferred that the siloxane compound according to the invention is not a salt as it may complicate the formulation of the adhesive formulation or the sealant formulation in some cases.

The siloxane compound according to the invention preferably comprises at least one (direct) chemical bond between at least one building block according to formula (A) and at least one building block according to formula (B).

This means that in the siloxane compound according to the invention, a building block according to formula (A) is bound to a building block according to formula (B).

The two named building blocks are typically bound to each other by an oxygen atom between the two silicon atoms of the building blocks. Thus, the siloxane compound according to the invention comprises at least one moiety depictable as follows:

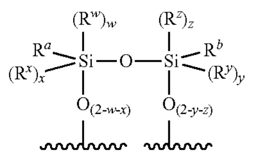

In above chemical formula a building block according to formula (A) is depicted on the left-hand side and a building block according to formula (B) is shown on the right-hand side. Further building blocks according to formulae (A) and/or (B) are optionally bonded to the oxygen atoms not bridging the two depicted silicon atoms in above formula.

$R^a$ is preferably selected from the group consisting of

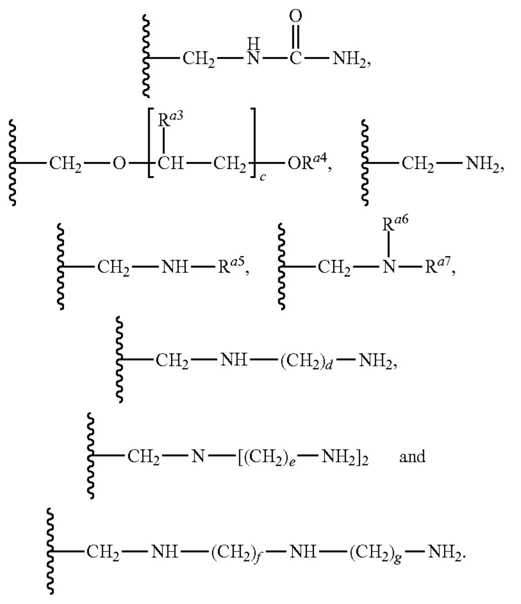

$R^a$ is more preferably selected from the group consisting of

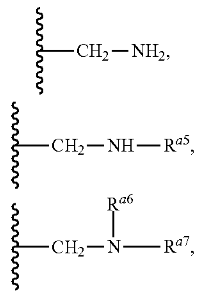

-continued

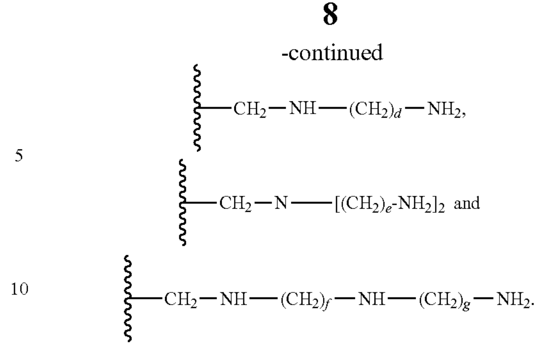

$R^a$ is even more preferably selected from the group consisting of

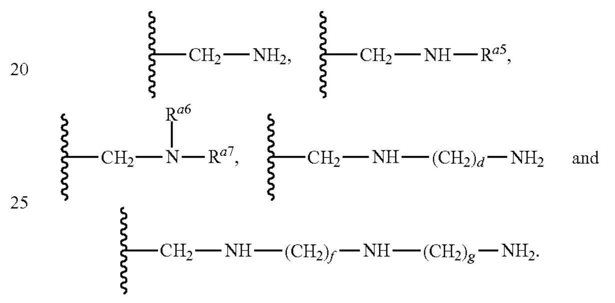

$R^a$ is still even more preferably selected from the group consisting of

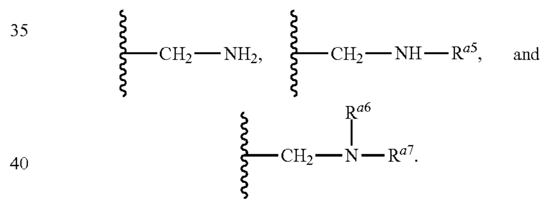

$R^a$ is most preferably

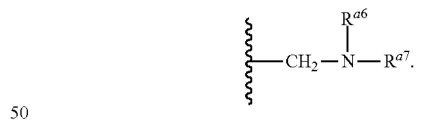

$R^{a1}$ and $R^{a4}$ are preferably independently a C1-C8-alkyl group, more preferably a C2-C4-alkyl group. $R^{a5}$, $R^{a}$B and $R^{a7}$ are preferably a C1-C8-alkyl group, more preferably a C1-C4-alkyl group, even more preferably a C2-C4-alkyl group. $R^{a2}$ preferably is hydrogen. $R^{a3}$ preferably is hydrogen.

c is an integer preferably ranging from 1 to 20, more preferably from 1 to 10. Preferably, d, e, f and g are integers independently ranging from 2 to 3, even more preferably d, e, f and g are 2.

$R^w$ is preferably a C1-C18-alkyl group, more preferably a C1-C4-alkyl group, most preferably a methyl group.

Each $R^x$ is preferably independently selected from the group consisting of hydroxy group, oxy-C1-C4-alkyl group, oxy-C1-C4-alkanediyloxy-C1-C4-alkyl group and oxy-acetyl group. More preferably, $R^x$ is selected from the group consisting of hydroxy group, methoxy group and ethoxy group. Especially in case of reactive adhesive formulations or sealant formulations, the latter two are still even more preferred because of faster skin formation time.

Preferably, w is 0.

In case the siloxane compound according to the invention comprises more than one building block according to formula (A), x on average preferably ranges from 0.5 to 2.7, more preferably from 0.7 to 2, even more preferably from 0.9 to 1.1. In case a mixture of siloxane compounds according to the invention is employed, x on average (based on said mixture) preferably lies in above ranges.

L is preferably a C3-C6-alkanediyl group, more preferably selected from 1,3-propanediyl ($—CH_2—CH_2—CH_2—$) and iso-butadiyl ($—CH_2—CH(CH_3)—CH_2—$) and even more preferably L is 1,3-propanediyl.

$R^b$ is preferably selected from the group consisting of

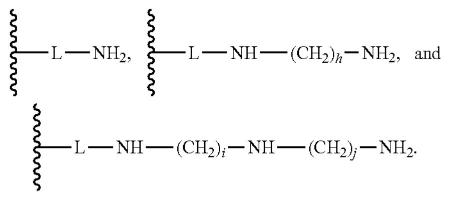

More preferably, $R^b$ is selected from the group consisting of

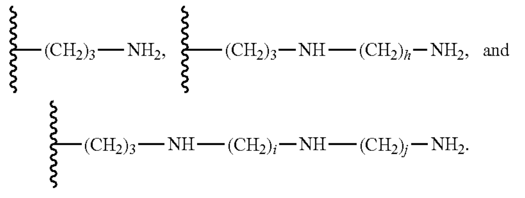

The integers h, i and j are independently from each other preferably selected from 2 and 3, more preferably they are 2.

It is particularly preferred that $R^b$ is selected from the group consisting of

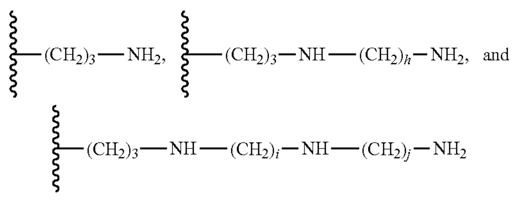

with h, i and j being integers independently ranging from 2 to 3.

$R^{b1}$, $R^{b2}$ and $R^{b3}$ are preferably selected from the group consisting of C1-C8-alkyl group, more preferably selected from the group consisting of C2-C4-alkyl group.

$R^y$ is preferably selected from the group consisting of hydroxy group, oxy-C1-C4-alkyl group, oxy-C1-C4-alkanediyloxy-C1-C4-alkyl group and oxyacetyl group. More preferably, $R^y$ is selected from the group consisting of hydroxy group, methoxy group and ethoxy group. Especially in case of reactive adhesive formulations or sealant formulations, the latter two are still even more preferred because of faster skin formation time.

$R^z$ is preferably a C1-C18-alkyl group, more preferably a C1-C4-alkyl group, most preferably a methyl group. Preferably, z is 0. More preferably, w and z both are 0.

In case the siloxane compound according to the invention comprises more than one building block according to formula (B), y in average preferably ranges from 0.5 to 2.7, more preferably from 0.7 to 2, even more preferably from 0.9 to 1.1. In case a mixture of siloxane compounds according to the invention is employed, y on average (based on said mixture) preferably lies in above ranges.

The (numerical) ratio of building blocks according to formula (A) to building blocks according to formula (B) preferably ranges from 0.05 to 10, more preferably from to 0.1 to 3, even more preferably from to 0.55 to 2, still even more preferably from 0.9 to 1.1. Most preferably, said ratio is 1.0. In the latter case, the siloxane compound comprises an equal number of building blocks according to formulae (A) and (B). Said ratios of building blocks according to formulae (A) and (B) advantageously provide a superior reactivity and mechanical performance due to excellent adhesion properties.

The siloxane compound according to the invention preferably comprises 1 to 50, more preferably 1 to 30, even more preferably 2 to 30, still even more preferably 3 to 10 building blocks according to formula (A). The siloxane compound according to the invention preferably comprises 1 to 30, more preferably 2 to 20, even more preferably 3 to 10, building blocks according to formula (B).

The ratio and the number of the building blocks according to formulae (A) and (B) in the siloxane compound according to the invention can be measured by standard analytical methods known by and readily available to the person skilled in the art. Exemplarily, $^1$H-NMR and/or $^{29}$Si-NMR can be used for this purpose, e.g. by comparing the signals for the α-protons bound on the carbon atoms adjacent to the silicon atoms of $R^a$ and $R^b$, respectively. Alternatively, the signals relating to $R^x$ and $R^y$, respectively, in relation to the silicon atoms in the siloxane compound according to the invention can be used for analytical purposes.

Preferably, the siloxane compound according to the invention is free of other polymeric building blocks, in particular of polyurethanes, polydimethylsiloxanes (referred to as silicones in the art), polyethers, polyacrylates, polybutadienes, copolymers and mixtures of the aforementioned. Particularly preferably, the siloxane compound according to the invention consists of the building blocks according to formulae (A) and (B).

In one embodiment of the present invention, the average number of hydrolysable alkoxy groups per silicon atom in the siloxane compounds according to the invention preferably ranges from 0.3 to 2.0, preferably from 0.5 to 1.5, more preferably from 0.75 to 1.25 as measurable by total hydrolysis and subsequent GC analysis or by NMR analysis. To have one or more hydrolysable alkoxy groups, one or more of $R^x$ and/or $R^y$ need to be other than hydroxy groups, preferably an alkoxy group, more preferably selected from methoxy and ethoxy group. This improves the reactivity of an adhesive formulation or a sealant formulation comprising such siloxane compound. In case a particularly eco-friendly compound is desired, the amount of hydrolysable alkoxy groups is preferably below said minimum thresholds, more preferably less than 0.1, ideally 0. This can be accomplished by selected $R^x$ and/or $R^y$ to be hydroxy groups (mostly or entirely in the last case).

As noted hereinbefore, the siloxane compound according to the invention comprises or preferably consists of the building blocks according to formulae (A) and (B). A siloxane compound consisting of the named building blocks was found to fulfill above-defined objectives particularly well.

The siloxane compound typically comprises one or more of linear, branched, catenary and cyclic structures. These structures are typically formed by the named building blocks according to formulae (A) and (B).

The building blocks according to formula (A) and the building blocks according to formula (B) in the siloxane compound according to the invention are arranged in one or more of random, gradient, block or alternating patterns. Preferably, the building blocks according to formula (A) and the building blocks according to formula (B) are arranged in one or more of random, gradient or alternating patterns. It is thus possible within the meaning of the present invention that the siloxane compound according to the invention comprises entities where the individual building blocks are arranged in one pattern (e.g. random) while there is another entity in the same siloxane compound where the individual building blocks are arranged in another pattern (e.g. block).

In a preferred embodiment of the present invention, the siloxane compound comprises or preferably consists of at least one building block according to formula (A) wherein $R^a$ is selected from the group consisting of

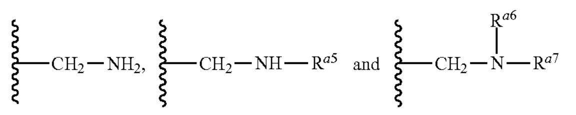

with $R^{a5}$, $R^{a6}$ and $R^{a7}$ each being independently a C1-C4-alkyl group, preferably a C2-C4-alkyl group, and at least one building block according to formula (B) wherein $R^b$ is selected from the group consisting of

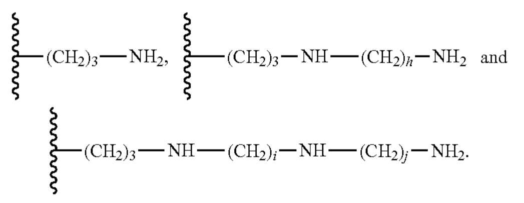

with h, i and j being integers independently ranging from 2 to 3. Such siloxane compounds showed outstanding properties when used as bonding agents in adhesive formulations or sealant formulations. In this embodiment, it is still preferred that w and z are 0. The building blocks according to formulae (A) and (B) can then be depicted as follows:

(A)

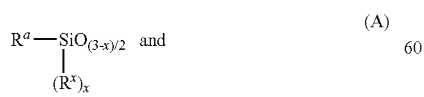

(B)

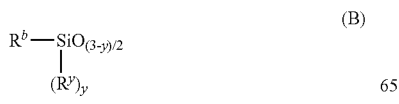

In one embodiment of the present invention, a mixture of at least two siloxane compounds according to the invention is employed. The siloxane compound according to the invention is bifunctional and can act as co-crosslinker in an adhesive formulation or in a sealant formulation. The siloxane compound according to the invention is advantageously used in an adhesive formulation or in a sealant formulation, e.g. as bonding agent.

Method for Synthesizing a Siloxane Compound

In a second aspect, the present invention concerns a method for synthesizing a siloxane compound, preferably the siloxane compound according to the invention.

According to the method for synthesizing a siloxane compound, preferably the siloxane compound according to the invention, at least one silane according to formula (I)

(I)

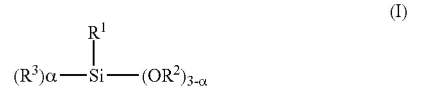

wherein $R^1$ is selected from the group consisting of

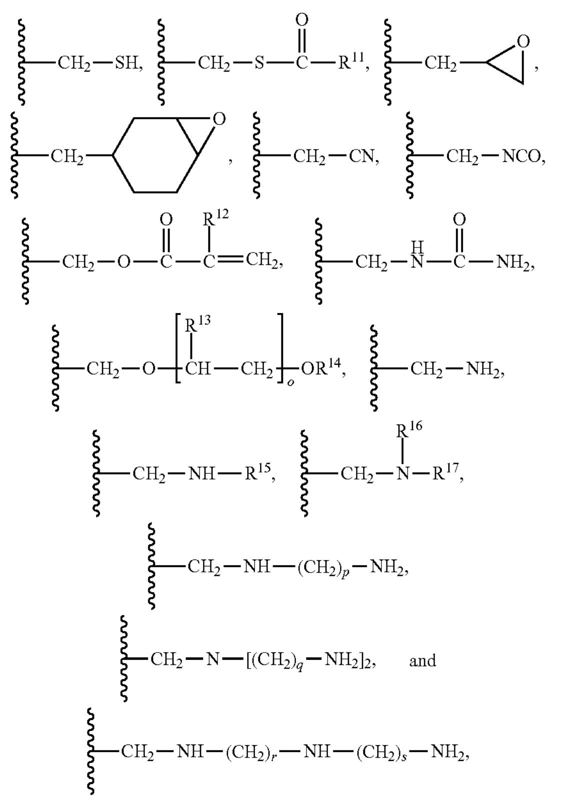

in which $R^{11}$, $R^{14}$, $R^{15}$, $R^{16}$ and $R^{17}$ are selected from the group consisting of alkyl group and aryl group, $R^{12}$ is selected from hydrogen and methyl group, each $R^{13}$ is independently selected from hydrogen and methyl group, o is an integer ranging from 1 to 40, p, q, r and s are integers independently ranging from 2 to 6, each $R^2$ is independently selected from the group consisting of hydrogen, alkyl group, alkanediyloxyalkyl group, aryl group and acyl group, $R^3$ is an alkyl group, $\alpha$ is a selected from 0 and 1, is reacted with at least one silane according to formula (II)

(II)

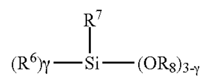

wherein $R^6$ is an alkyl group, $R^7$ is selected from the group consisting of

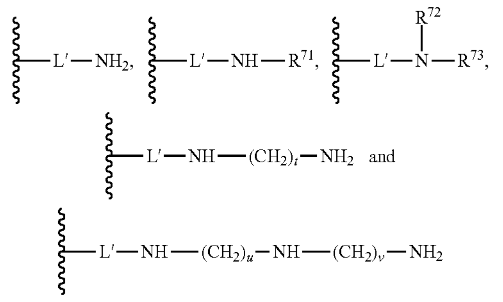

in which $R^{71}$, $R^{72}$ and $R^{73}$ are independently selected from the group consisting of alkyl group and aryl group, L' is a C3-C8-alkanediyl group, t, u and v are integers independently ranging from 2 to 6, each $R^8$ is independently selected from the group consisting of hydrogen, alkyl group, alkanediyloxyalkyl group, aryl group and acyl group, and $\gamma$ is selected from 0 and 1.

The reaction of the silane according to formula (I) and the silane according to formula (II) is typically a condensation reaction. It is optionally preceded by a hydrolysis step liberating a leaving group (formed essentially from $R^2$ or $R^8$, respectively) such as an alcohol or an acid (anion) from one of the named silanes. This hydrolysis can be mediated by water and/or some of the catalysts described hereinafter (in particular acids and bases).

$R^1$ is preferably selected from the group consisting of

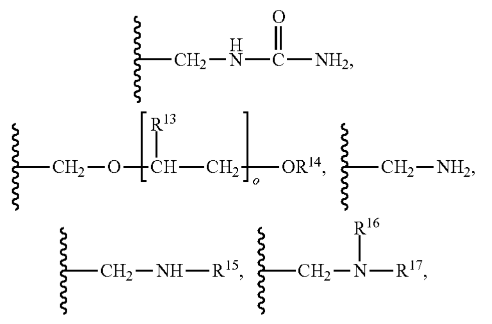

-continued

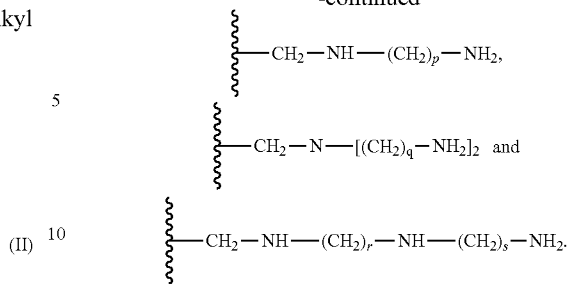

More preferably, $R^1$ is selected from the group consisting of

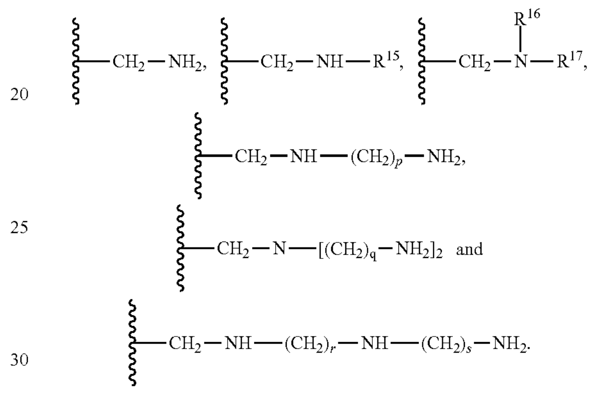

Even more preferably, $R^1$ is selected from the group consisting of

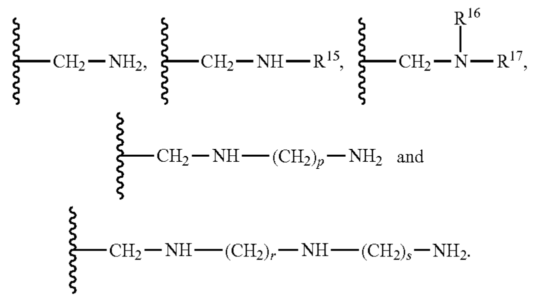

Still even more preferably, $R^1$ is selected from the group consisting of

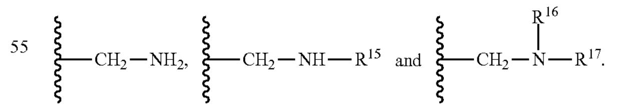

Most preferably, $R^1$ is

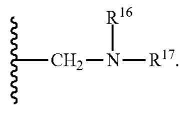

Preferably, o is an integer ranging from 2 to 20, more preferably from 2 to 10.

Preferably, p, q, r and s are independently selected from 2 and 3; more preferably, they are 2.

$R^2$ is preferably selected from the group consisting of C1-C4-alkyl group, C1-C4-alkanediyloxy-C1-C4-alkyl group and acetyl group. This selection allows for a faster hydrolysis and/or condensation and thus for shorter overall reaction durations. More preferably, $R^2$ is selected from the group consisting of methyl group and ethyl group, the latter being still even more preferred for environmental reasons.

$R^{11}$ and $R^{14}$ are preferably C1-C8-alkyl groups, more preferably C1-C4-alkyl groups. $R^{15}$, $R^{16}$ and $R^{17}$ are preferably C1-C8-alkyl groups, more preferably C1-C4-alkyl groups and even more preferably C2-C4-alkyl groups. $R^{12}$ preferably is hydrogen. $R^{13}$ preferably is hydrogen. $R^3$ is preferably a C1-C18-alkyl group, more preferably a C1-C4-alkyl group, most preferably a methyl group. $\alpha$ is preferably 0.

$R^6$ is preferably a C1-C18-alkyl group, more preferably a C1-C4-alkyl group, most preferably a methyl group. Preferably, $\gamma$ is 0. More preferably, $\alpha$ und $\gamma$ are both 0.

L' is preferably a C3-C6-alkanediyl group, more preferably selected from 1,3-propanediyl ($-CH_2-CH_2-CH_2-$) and iso-butadiyl ($-CH_2-CH(CH_3)-CH_2-$) and even more preferably L' is 1,3-propanediyl.

$R^7$ is preferably selected from the group consisting of

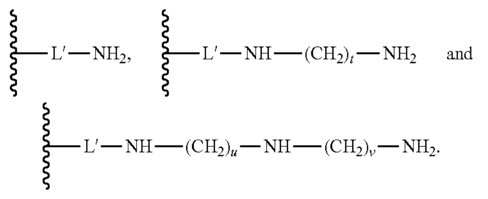

More preferably, $R^7$ is selected from the group consisting of

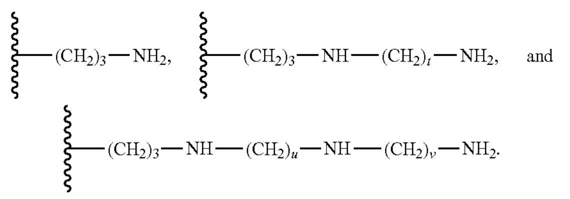

The integers t, u and v are independently from each other preferably selected from 2 and 3, more preferably they are 2. It is particularly preferred that $R^7$ is selected from the group consisting of

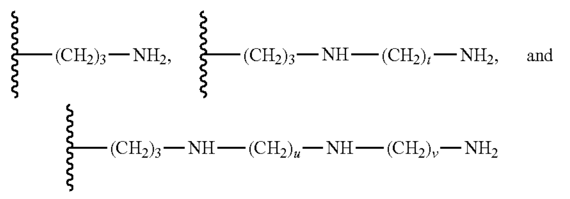

with t, u and v being integers independently ranging from 2 to 3.

$R^{71}$, $R^{72}$ and $R^{73}$ are preferably C1-C8-alkyl groups, more preferably C2-C4-alkyl groups.

$R^8$ is preferably selected from the group consisting of C1-C4-alkyl group, C1-C4-alkanediyloxy-C1-C4-alkyl group and acetyl group. This selection allows for a faster hydrolysis and/or condensation and thus for shorter overall reaction durations. More preferably, $R^8$ is selected from the group consisting of methyl group and ethyl group, the latter being still even more preferred for environmental and work safety reasons.

The molar ratio of the at least silane according to formula (I) to the at least one silane according to formula (II) preferably ranges from to 0.05 to 10, more preferably from to 0.1 to 3, even more preferably from to 0.55 to 2, still even more preferably from 0.9 to 1.1, most preferably they are used equimolarly. In case more than one silane of a certain type—be it a silane according to formula (I) or a silane according to formula (II)—is used in the reaction, the accumulated amount of substance of all silanes of a certain type applies.

Preferably, the reaction is mediated by a catalyst. Suitable catalysts and their effects on such condensation reactions of silanes are known in the art. Preferred catalysts are selected from the group consisting of organic acids, inorganic acids, organic bases, inorganic bases, fluoride sources, and metal compounds. Preferable organic acids are citric acid and malic acid. Preferable inorganic acids are nitric acid, hydrochloric acid and sulfuric acid. Preferable inorganic bases are metal hydroxides such as sodium hydroxide and potassium hydroxide. Preferable organic bases are alkylamines such as triethylamine and triethanolamine and alkoxides such as sodium methoxide. Preferable fluoride source are salts capable of liberating fluoride ions such as hydrogen fluoride, sodium fluoride and ammonium fluoride. Preferable metal compounds include particularly titanium and zirconium salts such as the respective alkoxides, e.g. titanium tetraisopropoxide and zirconium tetra isopropoxide.

The amount of catalyst depends on the silanes and the catalysts which are employed in the reaction. Useful amounts can be determined by routine experiments. As a general guideline, the inventors found a catalyst amount of 0.001 to 0.1, preferably 0.05 to 0.05, molar equivalents based on the total amount of silanes, to be useful. The catalyst is added at the beginning of the reaction or while the reaction proceeds.

Preferably, in order to facilitate the reaction of the silane according to formula (I) and the silane according to formula (II), water is added to said silanes. It can be added during said reaction or it can be charged into a suitable vessel before the silanes are added into said vessel. The first option is preferred as reaction control is facilitated. By adding water to the silanes, a targeted hydrolysis is achieved. This in turn allows for very narrow molecular mass distributions of the siloxane compound according to the invention yielding more predictable properties thereof.

The amount of water preferably ranges from 0.1 to 10 equivalents based on the total amount of silanes (i.e. the accumulated amount of substance of all silanes employed). More preferably, the amount of water ranges from 0.5 to 2 equivalents based on the total amount of silanes. The water is preferably added under thorough mixing, especially if no solvent capable of dissolving both the water and the silanes is employed.

Optionally, the reaction of the silane according to formula (I) and the silane according to formula (II) is carried out in at least one solvent (other than water). Generally, any solvent with a sufficient compatibility with the other components of the reaction can be used. Preferably, the at least one solvent is a protic solvent. More preferably, the at least one solvent is selected from the group consisting of methanol, ethanol, iso-propanol, n-propanol and mixtures of the aforementioned.

The reaction of the silane according to formula (I) and the silane according to formula (II) is usually carried out until the silane according to formula (I) and/or the silane according to formula (II) are entirely or almost entirely consumed (e.g. 90% or more). This can be controlled by standard means such as gas chromatography or NMR. Typical reaction durations range from 1 min to 24 h, preferably from 1 to 12 h, more preferably from 2 to 10 h, even more preferably from 6 to 8 h. The reaction is preferably carried out under an inert atmosphere to avoid undesired side-reactions, e.g. under nitrogen or argon atmosphere.

Useful temperatures to be employed during the reaction of the silane according to formula (I) and the silane according to formula (II) depend inter alia on the individual silanes used and the solvent, if any. Typically, the temperature during the reaction of the reaction of the silane according to formula (I) and the silane according to formula (II) preferably ranges from 10 to 95° C., more preferably from 50 to 90° C., even more preferably from 60 to 80° C.

The reaction of the silane according to formula (I) and the silane according to formula (II) preferably comprises a distillation step. The reaction of the silane according to formula (I) and the silane according to formula (II) is more preferably succeeded by the distillation step. Alternatively, the distillation step takes place during the course of the reaction and optionally, after its completion. Said distillation step aims at reducing the amount of solvent and possibly any liberated volatile organic compounds (VOCs) such as alcohols formed from the residues $R^2$ and $R^8$, respectively. This allows the amount of volatile organic compounds to be reduced and further advantageously, increases the flash point. Thus, the obtained siloxane compound allows an easier handling when used as less precautions need to be taken such as ventilation and explosion or fire prevention measures. The distillation step is preferably carried out using reduced pressure. Typically used bottom temperatures during the distillation range from 50 to 120° C. The pressure can be adjusted accordingly.

After the distillation step, the amount of volatile organic compounds (in particular of alcohols) is preferably 5 wt.-% or less, more preferably 1 wt.-% or less. The method is thus preferably suitable for synthesizing a siloxane compound according to the invention liberating a reduced amount of volatile organic compounds (VOC). The reduction in VOC is environmentally beneficial.

It is possible to start the reaction of the silane according to formula (I) and the silane according to formula (II) with one of the named silanes by adding water and/or an optional catalyst or with a mixture of the two named silanes.

In one embodiment of the present invention, the method for synthesizing a siloxane compound comprises the synthesis steps:

A1) charging the silanes according to formulae (I) and (II) into a suitable vessel, preferably under an inert atmosphere (e.g. nitrogen);

A2) adding water and optionally at least one solvent (other than water), individually or as a mixture with the water;

A3) optionally, adding a catalyst;

A4) heating the thus-obtained mixture for a time sufficient to form the siloxane compound; and A5) removing the volatile organic compounds from the reaction mixture by distillation during and/or after the completion of the reaction.

The order of method steps A1 to A3 may be changed to any order. Preferably, the steps are carried out in the order given above.

Alternatively, the silanes are added stepwise. In this case, the method for synthesizing a siloxane compound comprises the synthesis steps:

B1) charging one of the silanes according to formulae (I) and (II) into a suitable vessel, preferably in an inert atmosphere (e.g. nitrogen);

B2) adding water and optionally at least one solvent (other than water), individually or as a mixture with the water;

B3) optionally, adding a catalyst;

B4) adding the other silane according to formulae (I) and (II) to the resulting mixture;

B5) heating the thus-obtained mixture for a time sufficient to form the siloxane compound; and B6) removing the volatile organic compounds from the reaction mixture by distillation during and/or after the completion of the reaction.

The order of method steps B1 to B3 may be changed. It is also possible, albeit less preferred, to run method step B3 after method step B4. In the latter case, method steps B1 and B2 are carried out before method steps B4 and B3.

The Siloxane Compound Obtainable by the Method for Synthesizing a Siloxane Compound In a third aspect, the present invention concerns a siloxane compound (directly) obtainable or obtained by the method described hereinbefore. The details and preferences outlined hereinbefore apply mutatis mutandis.

The Adhesive Formulation or the Sealant Formulation According to the Invention

In a fourth aspect, the present invention concerns an adhesive formulation (also referred to as adhesive in the art) or a sealant formulation (also referred to as sealant in the art). The adhesive formulation and the sealant formulation according to the invention are preferably reactive and, particularly preferably moisture curing. Reactive adhesive formulations and sealant formulations are—in the context of the present invention—preferably moisture curing, meaning that they can produce a bond between two surfaces or a seal when subjected to water.

The adhesive formulation or the sealant formulation according to the invention comprises at least one siloxane compound according to the invention. The siloxane compound according to the invention is typically used as bonding agent in the adhesive formulation or the sealant formulation according to the invention.

The amount of the siloxane compound according to the invention in the adhesive formulation or the sealant formulation according to the invention preferably ranges from 0.1 to 10 wt.-%, more preferably from 0.2 to 5 wt.-%, even more preferably from 0.5 to 2.5 wt.-%, based on the total weight of the adhesive formulation or sealant formulation according to the invention.

The adhesive formulation or the sealant formulation according to the invention comprises optionally at least one additive. The at least one optional additive is selected from the group consisting of polymers (particularly silane modified polymers (SMP)), fillers, pigments or dyes, plasticizers, rheology aids, further bonding agents, tackifier resin, desiccants, solvents, defoamers, UV stabilizers, antioxidants, catalysts for the crosslinking reaction of the siloxane compound, hydrolysis stabilizers, reactive diluents, adhesive resins, flame retardants, adhesion promoters, further additives which impart a particular property to the composition, such as conductivity additives or wetting aids, and mixtures of two or more of the aforementioned additives. More preferably, the at least one additive is selected from the group consisting of polymers (particularly silane modified polymers), fillers, tackifier resins, plasticizers and catalysts for the crosslinking reaction of the siloxane compound and mixtures of two or more of the aforementioned additives.

The amount of the additives, based on the total weight of the adhesive formulation or sealant formulation according to the invention, typically ranges from 1.0 to 99.5 weight-%, preferably from 90.0 to 99.9 weight-%, more preferably from 97.5 to 99.5 weight-%. The balance to 100 weight-% in this case is typically the siloxane compound according to the invention. The amounts of the individual additives (if more than one is used) can be based on standard formulations or routine experiments.

The adhesive composition or sealant formulation according to the invention preferably comprises at least one polymer. Polymers to be used in adhesive or sealant formulations are widely available to the person skilled in the art and can be selected based on their known properties and routine experiments, if necessary. Silane modified polymers are preferred in the context of the present invention. A silane modified polymer is a polymer which has been modified with silane groups. The silane modified polymer preferably belongs to a polymer group such as polyurethanes, polysiloxanes (corresponding to silicones), polyethers, polyacrylates or polybutadienes, provided that they have at least one and preferably at least two silane group(s) per polymer molecule. The silane groups may be attached to different sites in the polymer molecule. They are preferably end groups (=terminal groups) of the polymer and/or non-terminal groups in the structure of the polymer. The silane groups are selected from the group of the alkyldialkoxysilane groups and/or the trialkoxysilane groups, especially from the group of methyldimethoxysilane groups and/or trimethoxysilane groups and/or methyldiethoxysilane groups and/or triethoxysilane groups. Very particular preference is given to compositions wherein the modified silane modified polymer having terminal or non-terminal alkyldialkoxysilane groups and/ortrialkoxysilane groups. The silane group in the silane modified polymers imparts the property of entering into crosslinking reactions with ingress of moisture to this component. In general, on ingress of moisture, for example of air humidity, depending on the nature of the hydrolysable moiety of the silane group (e.g. an alkoxy group), silicon-oxygen bridges Si—O—Si form with elimination of alcohol, carboxylic acid, oxime or amine. This generally occurs with silane groups of different polymers, and thereby a three-dimensional network forms.

The silane group(s) can be bonded to the polymer structure in a wide variety of different ways. The silicon atom of the silane group may be coupled directly to the polymer structure or via a spacer group, such as an alkanidiyl group. The silane group is exemplarily coupled via reactive end groups, for example via vinyl, hydroxyl, amino or isocyanate groups of the polymers, which can be reacted with corresponding reactive groups of the silane group.

For example, it is possible to react polyurethanes terminated with isocyanate groups with aminoalkyltrialkoxysilanes to give a trialkoxysilane-terminated polyurethane. These reactions are known to those skilled in the art and corresponding polymers are commercially available, for example from Bayer MaterialScience AG, Momentive Specialty Chemicals Inc. and Evonik Operations GmbH.

An example of polyethers terminated with silane groups are MS polymers from Kaneka Corporation. An example of polyacrylates terminated with silane groups are XMAP polymers from Kaneka Corporation. An example of polybutadienes terminated with silane groups are EPION polymers from Kaneka Corporation. Examples of polysiloxanes terminated with silane groups are commercially available moisture-crosslinking polysiloxanes from a wide variety of different manufacturers (RTV 1 products). The content of silane groups in the silane modified polymer used in accordance with the invention is typically from 1 to 20, preferably from 2 to 10. For each polymer molecule, an average of two to ten, preferably two to four, silane groups are present.

The polymers are generally liquid at 25° C. and typically have viscosities at 25° C. in the range from 5000 to 1 000 000 mPas, preferably from 10 000 to 50 000 mPas (determined according to DIN 53019). Particularly preferred silane modified polymers are polyurethanes which have been modified with silane groups and have a viscosity at 25° C. of 10 000 to 1 000 000 mPas, preferably of 30 000 to 50 000 mPas (determined according to DIN 53019). The amount of the polymer preferably ranges from 20 to 98 weight-% based on the total weight of the adhesive formulation or sealant formulation according to the invention.

The adhesive composition or sealant formulation according to the invention preferably comprises at least one filler. Useful fillers can be selected from a multitude of materials. For example, it is possible to use chalks, natural ground or precipitated calcium carbonates, calcium magnesium carbonates, silicates of the aluminum magnesium calcium silicate type, for example wollastonite, or barytes and carbon black. It is alternatively possible to use sheet silicates, for example fillers in leaflet form, for example vermiculite, mica or talc. Frequently, mixtures of fillers are used. For example, it is possible to use natural ground chalks in surface-coated form or else uncoated chalks, and also precipitated surface-coated chalks. The amount of the (one or more) filler(s) preferably ranges from 40 to 65 weight-% based on the total weight of the adhesive formulation or sealant formulation according to the invention. In some cases, it is advantageous to dry the fillers (i.e. remove water therefrom) as they are used often used in comparatively large quantities in the adhesive formulation or the sealant formulation to avoid undesired side-reactions. For this purpose, there are many conventional methods available to the person skilled in the art, e.g. placing the filler in a desiccator over a suitable drying agent for a time sufficiently long to remove water attached thereto or removing water therefrom by subjecting the filler to elevated temperatures.

The adhesive composition or sealant formulation according to the invention preferably comprises at least one plasticizer. Preferred plasticizers are alkyl phthalates, such as dibutyl phthalate, dioctyl phthalate, benzyl butyl phthalate, dibenzyl phthalate, diisononyl phthalate, diisodecyl phthalate and diundecyl phthalate. Also suitable, however, are the known plasticizers from the group of the organic phosphates, adipates and sebacates, or else benzyl benzoate, liquid polybutenes, dibenzoates or di- or oligopropylene glycols, alkylsulphonates of phenol or cresol, dibenzyltoluene or diphenyl ether or diisononyl cyclohexane-1,2-dicarboxylate. The selection criteria for the plasticizers used with particular preference are guided firstly by the adhesive formulation or the sealant formulation and secondly by the viscosity, and also by the desired rheological properties. The amount of the plasticizer preferably ranges from 10 to 50 weight-% based on the total weight of the adhesive formulation or sealant formulation according to the invention.

The adhesive composition or sealant formulation according to the inventions preferably comprises one or more tackifier resin, which can generally be divided into natural and synthetic resins. Examples of these include alkyd resins, epoxy resins, melamine resins, phenol resins, urethane resins, hydrocarbon resins, and natural resins such as rosin, wood turpentine oil and tall oil. The synthetic resins include hydrocarbon resins, ketone resins, coumarone-indene resins, isocyanate resins and terpene-phenol resins. The amount of the tackifier resin preferably ranges from 0.1 to 10.0 weight-% based on the total weight of the adhesive formulation or sealant formulation according to the invention.

The adhesive composition or sealant formulation according to the invention preferably comprises at least one desiccant. Suitable desiccants are, for example, alkoxysilanes such as vinyltrimethoxysilane. The amount of the at least one desiccant preferably ranges from 0.1 to 5.0 weight-%, more preferably from 0.5 to 2.5 weight-%, based on the total weight of the adhesive formulation or sealant formulation according to the invention.

The adhesive composition or sealant formulation according to the invention preferably comprises at least one catalyst for the crosslinking reaction of the siloxane compound and optionally, the polymer, preferably the silane modified polymer. The person skilled in the art is aware of such catalysts. Such catalysts can allow for inter- and/or intramolecular crosslinkage of the siloxane compound. Examples of these are tin catalysts, for example tin complexes such as dioctyltin diacetonate or dialkyltin carboxylates such as dibutyltin dilaurate or dibutyltin distearate. Other examples are amines (e.g. DABCO), and titanium compounds, zinc compounds, bismuth compounds or zirconium compounds (e.g. titanates or zirconates). The amount of the catalyst for crosslinking reaction of the siloxane compound preferably ranges from 0.01 to 3.0 wt.-%, preferably from 0.01 to 0.5 wt.-%, more preferably from 0.01 to 0.2 wt.-%, based on the total weight of the adhesive formulation or sealant formulation according to the invention. Advantageously, the amount of catalyst for crosslinking reaction of the siloxane compound can be reduced without any adverse effect compared to prior art solutions.

In addition, the adhesive composition or sealant formulation according to the inventions optionally comprises at least one solvent. The at least one solvent is preferably a liquid hydrocarbon (liquid at 20° C., normal pressure) preferably selected from pentane, hexane and mixtures thereof.

Optionally, the adhesive composition or sealant formulation according to the invention comprises at least one pigment or dye. Inorganic or organic are commercially available and many colored compounds may be used for this purpose (provided that it is compatible with the formulation). Preferred examples of pigments are titanium dioxide or carbon black.

The adhesive formulation or sealant formulation according to the invention optionally comprises at least one defoamer. Examples of the at least one defoamer include fatty alcohol-based or silicone-based defoamers.

In addition, the adhesive composition or sealant formulation according to the inventions optionally comprises at least one antioxidant. Examples of the at least one antioxidant are phenols, especially sterically hindered phenols, polyfunctional phenols, sulfur- or phosphorus-containing phenols, amines, especially HALS types (hindered amine light stabilizers).

Optionally, the adhesive composition or sealant formulation according to the inventions optionally comprises at least one rheology aid. Preferred rheology aids are thixotropic agents such as fumed and precipitated silicas, bentonites, urea derivatives, polyamide waxes, fibrillated short fibers or short pulp fibers.

Moreover, the adhesive composition or sealant formulation according to the invention optionally includes at least one further bonding agent (other than the siloxane compound according to the invention). Preference is given to using further bonding agents based on hydrocarbon resins, phenol resins, terpene-phenol resins, resorcinol resins or derivatives thereof, modified or unmodified resin acids or esters thereof (such as abietic acid derivatives), polyamines, polyamine amides, anhydrides or anhydride-containing copolymers. Preferably, the adhesive composition or sealant formulation according to the invention does not comprise any further bonding agents facilitating the formulation thereof.

The adhesive composition or sealant formulation according to the invention optionally comprises at least one UV stabilizer. Suitable UV stabilizers are, for example, hydroquinone, hydroquinone methyl ether, 2,3-(di-tert-butyl)hydroquinone, 1,3,5-trimethyl-2,3,6-tris(3,5-di-tert-butyl-4-hydroxybenzyl)benzene, pentaerythritol tetrakis-3-(3,5-di-tert-butyl-4-hydroxyphenol)propionate, n-octadecyl 3,5-di-tert-butyl-4-hydroxyphenyl)propionate, 4,4-methylenebis(2,6-di-tert-butylphenol), 4,4-thiobis(6-tert-butyl-o-cresol), 2,6-di-tert-butylphenol, 6-(4-hydroxyphenoxy)-2,4-bis(n-octylthio)-1,3,5-triazine, di-n-octacecyl 3,5-di-tert-butyl-4-hydroxybenzylphosphonate, 2-(n-octylthio)ethyl-3,5-ditert-butyl-4-hydroxybenzoate, sorbitol hexa[3-(3,5-di-tert-butyl-4-hydroxyphenyl)propionate], p-hydroxydiphenylamine, N,N'-diphenylenediamine or phenothiazine. Alternatively, inorganic compounds such as titanium dioxide, iron oxide or zinc oxide can be used. Said inorganic compounds are preferably used in their nanoparticulate form (i.e. with a $d_{50}$ of 100 nm or below, measured by light scattering).

In a preferred embodiment of the present invention, the adhesive formulation or sealant formulation according to the invention comprises (or consists of)

- at least one siloxane compound, preferably one according to the invention, typically as bonding agent (preferably in an amount of 0.1 to 10 weight-%);
- at least one polymer, preferably at least one silane modified polymer (preferably in an amount of to 98 weight-%);
- optionally, at least one tackifier resin (preferably in an amount of 0.1 to 10 weight-%);
- optionally, at least one plasticizer (preferably in an amount of 10 to 50 weight-%);
- optionally, at least one filler (preferably in an amount of 40 to 65 weight-%);
- optionally, at least one desiccant (preferably in an amount of 0.1 to 5.0 weight-%) and
- optionally, at least one catalyst for the crosslinking reaction of the siloxane compound (preferably in an amount of 0.01 to 3.0 weight-%). In this embodiment, it is preferred that the adhesive formulation or sealant formulation according to the invention comprises (or consists of) the named optional compounds.

Generally, the adhesive formulation or sealant formulation can be prepared by mixing the individual components described hereinbefore. The person skilled in the art knows methods and ways how to mix the components and can adept the formulation process based on his general knowledge. It is also possible within the means of the present invention to use a standard adhesive or sealant formulation (i.e. an adhesive or sealant without the siloxane compound according to the invention) and add the siloxane compound according to the invention.

Preferably, the adhesive formulation or sealant formulation according to the invention are produced by mixing the individual components with exclusion of moisture. This is known to those skilled in the art, and the mixing can be undertaken, for example, in planetary mixers and dissolvers which are customary in the art. In this context, it is preferred to work under reduced pressure or under a nitrogen atmosphere.

After production, the adhesive formulation or sealant formulation according to the invention is preferably dispensed into an airtight vessel, for example into a cartridge or into a plastic bag, and preferably at least partly blanketed in these vessels with protective gas (e.g. nitrogen). The adhesive formulation or sealant formulation according to the invention can be applied from the vessel manually or with the aid of a metering apparatus. The person skilled in the art is aware of the individual variants of the processing of the adhesive formulation or the sealant formulation.

The adhesive formulation or sealant formulation according to the invention have very good storage stability, especially if stored with exclusion of moisture. After application to the substrates to be bonded, they preferably cure under the influence of moisture being a reactive formulation (vide supra). In general, air humidity is sufficient to bring about the crosslinking of the reactive adhesive formulation or sealant formulation according to the invention.

The adhesive formulation or sealant formulation according to the invention has a very good processability and can be processed in a simple manner. After application to the substrates, a skin is formed. At 23° C. and 50% relative air humidity, a skin typically forms within 1 to 120 minutes (depending on formulation). The duration of the cure-through depends on various factors including the thickness of the adhesive bond desired. Typically, cure-through of a layer of 1 to 5 mm proceeds within 24 hours.

The bonds produced according to the present invention are notable for outstanding mechanical properties and for excellent adhesion. Through-cured bonds typically have a tensile stress at 100% elongation of 0.1 to 10 $N/mm^2$, and tensile strengths of 1 to 15 $N/mm^2$, elongations at break of 100% to 2000%, and Shore A hardnesses of 20 to 90.

The Kit-of-Parts

In a fifth aspect, the present invention concerns a kit-of-parts for providing the adhesive formulation or sealant formulation according to the invention.

Said kit-of-parts comprises at least a component C1 and a component C2 wherein the component C1 comprises the at least one siloxane compound according to the invention and optionally at least one additive selected from the group consisting of fillers, pigments, dyes, plasticizers, rheology aids, bonding agents, tackifier resins, desiccants, solvents, defoamers, UV stabilizers, antioxidants, catalysts for the crosslinking reaction of the siloxane compound, hydrolysis stabilizers, reactive diluents, adhesive resins, flame retardants, adhesion promoters, further additives which impart a particular property to the composition, such as conductivity additives or wetting aids, and mixtures of two or more of aforementioned additives; and the component C2 comprises water.

Above described additives are optionally added to one of components C1 and C2. Preferably, the component C1 comprises the polymer, the desiccant and the catalyst for the crosslinking reaction of the siloxane compound to avoid any undesired reactions with water present in the component C2 of said additives. Component C1 is preferably free of water.

The component C2 is either water (e.g. 99.0 wt.-% water) or preferably a paste including the water needed for the crosslinking. Said paste may be a paste comprising water and one or more of fillers rheological aids, preferably a thickener, plasticizers and optionally, acids and/or bases to adjust the pH value of the paste, if necessary. Preferably, the paste is adjusted to a viscosity suitable for the desired use. The amount of water in the paste preferably ranges from 0.5 to 99.9 wt.-%, more preferably from 1 to 10 wt.-%.

The two parts have to be mixed before usage, e.g. with static mixers. The two components are often filled in twin cartridges with a static mixer for mixing during emptying (e.g. by pressing out).

The Method for Applying the Adhesive Formulation or the Sealant Formulation According to the Invention In a sixth aspect, the present invention concerns a method for applying the adhesive formulation or a sealant formulation according to the invention onto at least a portion of at least one surface, comprising the method steps in the given order a) providing the at least one surface; and
b) treating said at least one surface with the adhesive formulation or the sealant formulation according to the invention.

Thereby, a treated surface is obtained.

The at least one surface preferably comprises or consists of at least one material selected from the group consisting of wood, glass, metals, plastics, mineral and mixtures of the aforementioned. The surface is optionally covered by one or more layers of paint.

Preferred plastics in the context of the present invention are polyolefin such as polypropylene and polyethylene (which have preferably been pretreated, for example by corona or plasma treatment or by flame treatment of the surface to further improve the mechanical properties), polyester, polycarbonate, poly(meth)acrylate, polyvinyl chloride, polycarbonate, polymethylmethacrylate, polystyrene and mixtures or blends of the aforementioned such as ABS (acrylonitrile-butadiene-styrene terpolymer). More preferred are polyesters (PET) and polymethmethacrylates (PMMA). The preferred metal is aluminum.

The at least one surface is treated with the adhesive formulation or the sealant formulation according to the invention. To that end, the adhesive formulation or the sealant formulation is brought onto said at least one surface. The surface is covered entirely with the adhesive formulation or only in parts. For example, the adhesive formulation or the sealant formulation according to the invention is spread onto the at least one surface or applied from a cartridge.

The method for applying an adhesive formulation or a sealant formulation according to the invention preferably does not include the step of treating the at least one surface with a primer. A primer is preparatory step aiming at improving the otherwise insufficient adhesive strength of a bond. An example of a commonly used primer is a silane (for example diluted in a suitable solvent). This step is no longer required when using the adhesive formulation or the sealant formulation according to the invention as the siloxane compound according to the invention is dual-functional and acts as bonding agent and as primer. Advantageously, the siloxane compound according to the invention itself improves the adhesion sufficiently so that there is no need for further primers anymore. It further acts as co-crosslinker.

Preferably, the method for applying the adhesive formulation according to the invention comprises a further method step after method step b):

c) forming a bond of the treated at least one surface with a further surface.

The further surface is preferably selected from the group defined for the at least one surface listed above. The further surface is brought into contact with the at least one surface and the adhesive formulation thereon. This can be accomplished by pressing the surfaces onto each other or by any other means.

It is essential that the further surface and the at least one surface are both in contact with the adhesive formulation on the at least one surface. Thereby, the two surfaces are bonded to each other by means of the adhesive formulation according to the invention. It is preferred to perform method step c) before the skin has formed on the adhesive formulation according to the invention, e.g. within the first 5, 10 or 30 min after its application (method step b)).

Preferably, the adhesive formulation is applied from the kit-of-parts according to the invention.

Even more preferably, it is applied from a twin cartridge encompassing the kit-of-parts according to the invention. The individual parts of the kit-of-parts in said twin cartridge can be mixed by pressing out the components of the kit-of-parts with a static mixer.

The present invention further concerns a bond or seal formed by applying the adhesive formulation or the sealant formulation according to the invention to at least one surface or by employing the method for applying an adhesive formulation or a sealant formulation according to the invention. A bond is formed when using the adhesive formulation according to the invention, a seal is formed when using the sealant formulation according to the invention.

The present invention further concerns articles comprising such bond or seal, e.g. such as the articles described herein.

Preference is given to using above-described adhesive formulations for producing bonds of the surfaces mentioned hereinbefore. Especially relevance is given to bonds of metal parts and plastic parts, bonds of two or more plastic parts, bonds of wood parts and plastic parts, bonds of glass parts and metal parts and/or plastic parts, bonds of mineral substrates and metals and/or plastic parts.

A further preferred use relates to the production of bonds indoors and outdoors, especially for applications in motor vehicle construction, container construction, appliance manufacture and shipbuilding, in the interior fit out of real estate, façade cladding, roof seals, etc., and in window and door construction. Most preferably, bonds are produced in the production of protective glazing, sandwich bonds, lighting covers, lamp holders, switch parts and control knobs, and in window construction.

The adhesive formulation according to the invention is of outstanding suitability for the tension-compensating adhesive bonding of a wide variety of different materials, some of which are difficult to bond to one another, such as wood, glass, metals, plastics and mineral substrates, indoors and outdoors.

The adhesive formulation or the sealant formulation according to the invention can preferably be used for applications in motor vehicle construction, container construction, appliance manufacture and shipbuilding, but also in the interior fitting of real estate, including "do-it-yourself (DIY)" applications, and in window and door construction.

Use examples of bonds with aluminum are bonds of roof elements, metal linings, for example sandwich bonds of aluminum, insulation and plastics in cooling container construction and insulation in garage construction, and also the sealing and bonding of ventilation ducts to one another. Use examples of bonds with polycarbonate are bonds of skylights, enclosures, for example bicycle racks, shelters, specific windshields, greenhouses, displays and computer monitors. Use examples of adhesive bonds with polymethylmethacrylate ("PMMA") are bonds of protective glazing to machinery, and also bullet-proof glass in banks and cash transport vehicles. Sandwich bonds (PMMA in, for example, an aluminum frame), of switchboards, lighting covers, lamp holders, switch parts and control knobs, and in window construction, for example for mobile home windows.

The invention will now be illustrated by reference to the following non-limiting examples.

EXAMPLES

Commercial products were used as described in the technical datasheet available on the date of filing of this specification unless stated otherwise hereinafter. The latest obtainable version of the cited standards was used unless stated otherwise.

Polymer ST 77 and Dynasylan® AMEO (3-aminopropyltriethoxysilane) were obtained from Evonik Operations GmbH. The phthalate plasticizer was obtained from Merck KGaA.

Synthetic Example I 49.89 g (0.2 mol) Diethylaminomethyltriethoxysilane (a silane according to formula (I)), 44.27 g (0.2 mol) Dynasylan® AMEO (a silane according to formula (II)) and 37.7 g ethanol were mixed in a 250 ml four-neck reaction apparatus equipped with dropping funnel and reflux condenser in a nitrogen atmosphere. Then, a mixture of 7.2 deionized water and 21.6 g ethanol was added drop-wise over the course of 10 min. After the complete addition of the solvent-water mixture, the reaction mixture was heated under reflux for 6 h. The temperature of the reaction mixture was slightly lowered (by approximately 5 to 10° C.) prior to the addition of 0.13 g sodium methoxide solution (40 weight-% in methanol). Thereafter, the reaction mixture was heated under reflux for further 2 h prior to the removal of all volatile organic compounds by distillation under reduced pressure. 62.3 g of the targeted siloxane compound were obtained.

Synthetic Example II 93.5 g (0.375 mol) Diethylaminomethyltriethoxysilane (a silane according to formula (I)), 99.2 g (0.375 mol) DAEO (2-aminoethyl-3-aminopropyltriethoxysilane, a silane according to formula (II)) and 77.1 g ethanol were mixed in a 500 ml four-neck reaction apparatus equipped with dropping funnel and reflux condenser in a nitrogen atmosphere. Then, a mixture of 13.5 deionized water an 40.5 g ethanol was added drop-wise over the course of 10 min. After the complete addition of the solvent-water mixture, the reaction mixture was heated under reflux for 6 h. The temperature of the reaction mixture was slightly lowered (by approximately 5 to 10° C.) prior to the addition of 0.27 g sodium methoxide solution (40 wt.-% in methanol). Thereafter, the reaction mixture was heated under reflux for further 2 h prior to the removal of all volatile organic compounds by distillation under reduced pressure. 126.0 g of the targeted siloxane compound were obtained.

Adhesive Formulation I (According to the Invention)

The following adhesive formulation comprising the below-listed ingredients was prepared by mixing the listed ingredients with the exclusion of water as described below.

| Ingredient | Function |
|---|---|
| 32.45 wt.-% Polymer ST 77 | silane modified polymer |
| 15.0 wt.-% phthalate plasticizer | plasticizer |
| 50.0 wt.-% chalk, coated with stearic acid | filler |
| 1.5 wt.-% vinyltrimethoxysilane | desiccant |
| 1.0 wt.-% siloxane compound of synthetic example I | bonding agent |
| 0.05 wt.-% dioctyltin diacetonate | catalyst for the crosslinking reaction of the siloxane compound |

In a rotation mixer (Speedmixer DAC 400 FVZ), the silane modified polymer and the plasticizer were mixed together for 20 seconds at 2500 rpm. Thereafter, the filler (dried in an oven at 105° C.) was mixed with the Speedmixer into the mixture within 1 minute at 2000 rpm and after manually transferring the mixture residing at the vessel walls into the inner part of the vessel, it was mixed for 1 minute at 2000 rpm. This preliminary mixture was then cooled down for 30 minutes at room temperature. After addition of the desiccant, the adhesion promoter and the catalyst, the mixture was mixed with the Speedmixer for 1 minute at 2000 rpm and after manually transferring the mixture residing at the vessel walls into the inner part of the vessel, it was mixed for 1 minute at 2000 rpm.

The thus-prepared adhesive formulation was transferred into a cartridge. The performance tests were effected from the cartridge.

Adhesive Formulation II (According to the Invention)

An adhesive formulation was prepared as described above for the adhesive formulation I but with the substitution of the siloxane compound of synthetic example I by the siloxane compound of synthetic example II.

Comparative Adhesive Formulation 1

A comparative adhesive formulation was prepared as described above for the adhesive formulation I but with the substitution of the siloxane compound of synthetic example I by Dynasylan® AMEO.

Performance Tests

The adhesive formulations were tested in accordance with DIN EN ISO 527:2019 and DIN EN 1465:2009 (tear strength, elongation at break, Tensile stress at 100% elongation, lap shear strength). The skin formation time was measured in accordance with DIN 52460:2015.

| Skin formation time | | |
|---|---|---|
| Adhesive formulation I | According to the invention | 46 min |
| Adhesive formulation II | According to the invention | 50 min |
| Comparative adhesive formulation 1 | Comparative | 125 min |

| Tear strength | | |
|---|---|---|
| Adhesive formulation I | According to the invention | 2.86 MPa |
| Adhesive formulation II | According to the invention | 2.2 MPa |
| Comparative adhesive formulation 1 | Comparative | 2.54 MPa |

| Elongation at break | | |
|---|---|---|
| Adhesive formulation I | According to the invention | 677.03% |
| Adhesive formulation II | According to the invention | 600.0% |
| Comparative adhesive formulation 1 | Comparative | 445.06% |

| Tensile stress at 100% elongation "100% Modulus" | | |
|---|---|---|
| Adhesive formulation I | According to the invention | 0.76 MPa |
| Adhesive formulation II | According to the invention | 0.67 MPa |
| Comparative adhesive formulation 1 | Comparative | 0.93 MPa |

| Lap shear strength | | | |
|---|---|---|---|
| | | substrate | |
| Adhesive formulation I | According to the invention | Aluminum | 3.26 MPa |
| | | PMMA | 2.41 MPa |
| Adhesive formulation II | According to the invention | Aluminum | 2.73 MPa |
| | | PMMA | 2.27 MPa |
| Comparative adhesive formulation 1 | Comparative | Aluminum | 3.20 MPa |
| | | PMMA | 2.14 MPa |

Above experiments showed the superiority of the siloxane compounds according to the invention compared to prior art solutions in adhesive formulations. The siloxane compounds allowed for improved mechanical properties to be obtained when used in an adhesive formulation. It further enhanced the bonding strength to substrates, in particular to plastic substrates such as PMMA.

Another striking advantage of the siloxane compounds according to the invention is the decisively shortened skin formation time compared to the prior art which allows the practitioner to continue with subsequent work steps in a shorter time, saving overall costs.

Other embodiments of the present invention will be apparent to those skilled in the art from a consideration of this specification or practice of the invention disclosed herein. It is intended that the specification and examples be considered as exemplary only.

The invention claimed is:

1. A kit-of-parts for providing an adhesive formulation or a sealant formulation, comprising at least one siloxane compound comprising:

at least one building block according to formula (A)

(A)

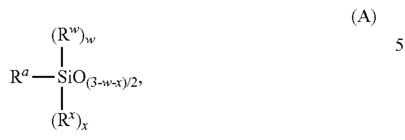

wherein $R^a$ is selected from the group consisting of

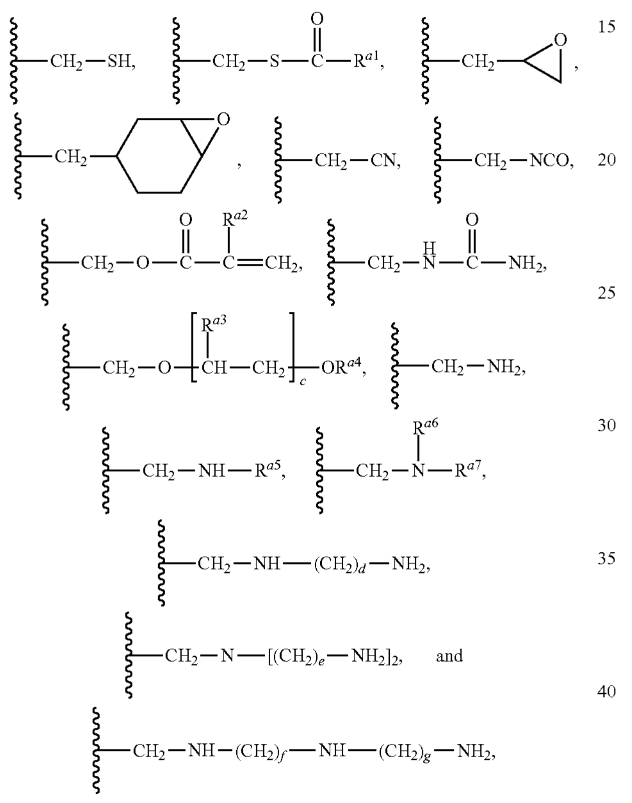

in which $R^{a1}$, $R^{a4}$, $R^{a5}$, $R^{a6}$, and $R^{a7}$ are independently selected from the group consisting of alkyl group and aryl group, $R^{a2}$ is selected from the group consisting of hydrogen and methyl group, each $R^{a3}$ is independently selected from the group consisting of hydrogen and methyl group, c is an integer ranging from 1 to 40, d, e, f, and g are integers independently ranging from 2 to 6, $R^w$ is an alkyl group, each $R^x$ is independently selected from the group consisting of hydroxy group, oxyalkyl group, oxyalkanediyloxyalkyl group, oxyaryl group, and oxyacyl group, w is selected from 0 and 1, and x is selected from 0, 1, and 2, with the proviso that a sum of w and x ranges from 0 to 2, and at least one building block according to formula (B)

(B)

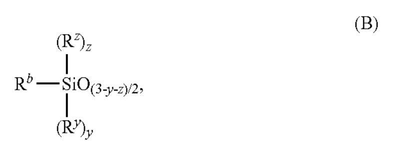

wherein $R^b$ is selected from the group consisting of

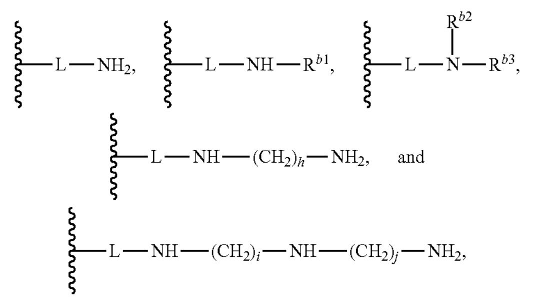

in which

L is a C3-C8-alkanediyl group, $R^{b1}$, $R^{b2}$, and $R^{b3}$ are selected from the group consisting of alkyl group and aryl group, h, i, and j are integers independently ranging from 2 to 6, each $R^y$ is independently selected from the group consisting of hydroxy group, oxyalkyl group, oxyalkanediyloxyalkyl group, oxyaryl group, and oxyacyl group, $R^z$ is an alkyl group, y is selected from 0, 1, and 2, z is selected from 0 and 1, with the proviso that a sum of y and z ranges from 0 to 2, or a salt of the siloxane compound, the kit-of-parts comprising:

at least a component C1, and a component C2, wherein the component C1 comprises the at least one siloxane compound, and optionally, at least one additive selected from the group consisting of a filler, a pigment, a dye, a plasticizer, a rheology aid, a bonding agent, a tackifier resin, a desiccant, a solvent, a defoamer, a UV stabilizer, an antioxidant, a catalyst for a crosslinking reaction of the siloxane compound, a hydrolysis stabilizer, a reactive diluent, an adhesive resin, a flame retardant, an adhesion promoter, a further additive which imparts a property to the adhesive formulation or the sealant formulation, and a mixture of two or more of aforementioned additives; and wherein the component C2 comprises water.

2. A method for applying an adhesive- or sealant formulation onto a least a portion of at least one surface, the method comprising:

a) providing the at least one surface, and b) treating said at least one surface with a mixture of an adhesive or sealant formulation from the kit of parts.

3. The kit-of parts according to claim 1, wherein, in the siloxane compound, w is 0.

4. The kit-of parts according to claim 1, wherein, in the siloxane compound, z is 0.

5. The kit-of parts according to claim 1, wherein, in the siloxane compound, $R^b$ is selected from the group consisting of

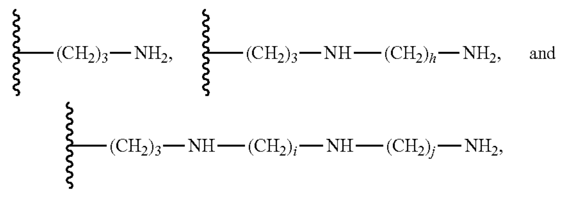

and wherein h, i, and j are integers independently ranging from 2 to 3.

6. The kit-of parts according to claim 1, wherein, in the siloxane compound, $R^a$ is selected from the group consisting of

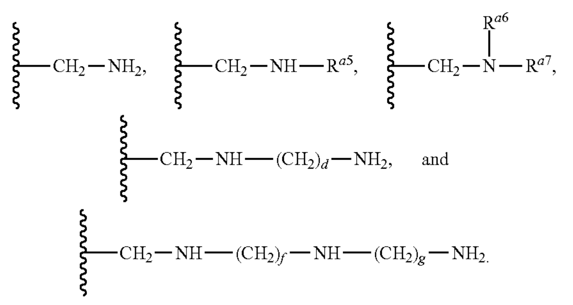

and

7. The kit-of parts according to claim 6, wherein, in the siloxane compound, $R^a$ is selected from the group consisting of

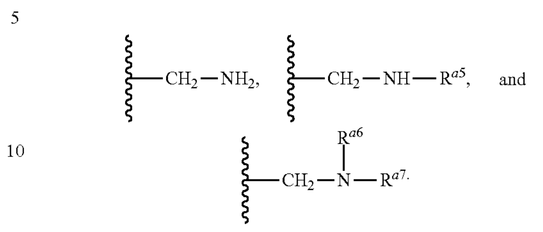

and

8. The kit-of parts according to claim 1, wherein, in the siloxane compound, a ratio of the at least one building block according to formula (A) to the at least one building block according to formula (B) ranges from 0.05 to 10.

9. The kit-of parts according to claim 1, wherein the siloxane compound comprises 1 to 50 of the at least one building block according to formula (A), and 1 to 30 of the at least one building block according to formula (B).

10. The kit-of parts according to claim 8, wherein, in the siloxane compound, the ratio of the at least one building block according to formula (A) to the at least one building block according to formula (B) ranges from 0.1 to 3.

11. The kit-of parts according to claim 8, wherein, in the siloxane compound, the ratio of the at least one building block according to formula (A) to the at least one building block according to formula (B) is 1.

* * * * *